Jan. 13, 1948.    J. KOHN ET AL    2,434,416
METHOD FOR FORMING ARTIFICIAL TEETH
Filed April 15, 1944
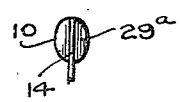
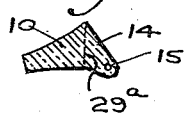
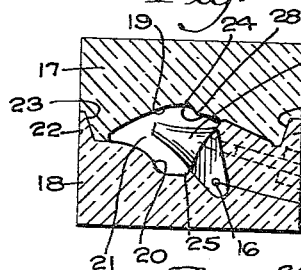
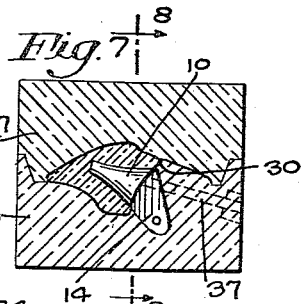
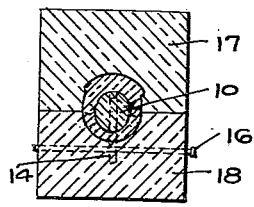
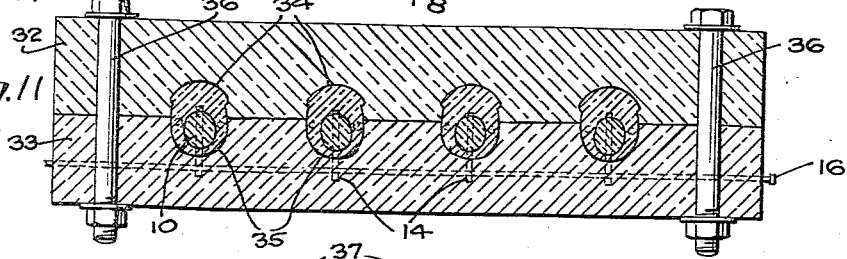
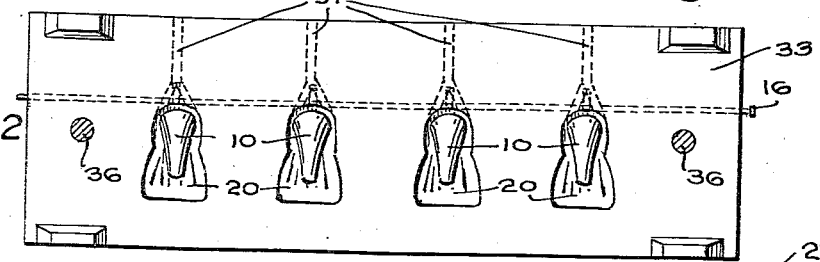
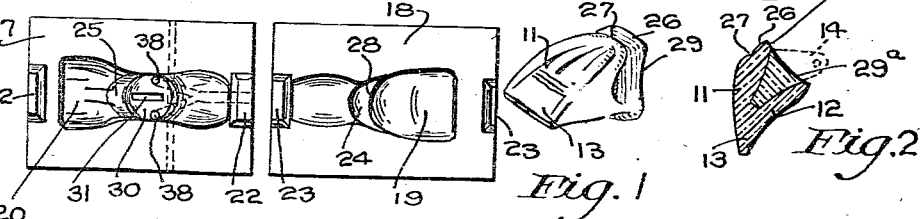
Inventor
JOSEPH KOHN
MICHAEL RUSSELL STEIN
By Leo Edelson
Attorney.

Patented Jan. 13, 1948

2,434,416

UNITED STATES PATENT OFFICE 2,434,416

METHOD FOR FORMING ARTIFICIAL TEETH

Joseph Kohn, Merion, Pa., and Michael Russell Stein, New York, N. Y., assignors to Universal Dental Company, Philadelphia, Pa., a corporation of Pennsylvania Application April 15, 1944, Serial No. 531,276

1 Claim. (Cl. 18—55.1)

This invention relates to improvments in the method of molding artificial teeth whereby the coloring and general appearance of natural teeth may be very closely simulated.

Heretofore and prior to the present invention, it has been a common practice in the art to mold artificial teeth of porcelain wherein the body portion of the tooth is formed of a relatively opaque porcelain while the face and tip portions of the tooth are formed of a relatively translucent or transparent porcelain. In forming the teeth of these two different porcelain compositions, the general procedure has been to first prepare the porcelain compositions in more or less pasty condition, following which they are introduced into the mold cavities by hand in proper superimposed relation and then compressed and biscuited as a preliminary to the final vitrifying operation. Not only is this process slow and demanding of expert skill in the proper placement of the porcelain compositions in the mold, but more importantly, due to the fact that the procedure is largely a hand operation, it resulted in the production of teeth which lacked uniformity in their final shading or coloring.

One of the major problems in the manufacture of artificial teeth has been to insure uniformity of shading or coloring in teeth intended to be duplicates of each other. Of course, all artificial teeth as produced by the manufacturer thereof are not of the same coloring, it being the general practice of the manufacturer to produce each given tooth of a certain size and shape in a range of colorings or shadings so that the proper tooth may be selected for a particular dental restoration. However, it is extremely important that all duplicate teeth should be of the same shade or color and while every effort has been made by the manufacturer to insure this desirable object, it has been almost impossible, under conventional practice, to accurately and strictly control the shading of the teeth.

It is accordingly among the principal objects of the present invention to provide a procedure and method of molding by which accurate and strict control of the shading of artificial teeth may be insured and by which duplicate teeth of uniform coloring may be produced rapidly, inexpensively and quite satisfactorily without necessitating the employment of highly skilled labor.

A further object of the present invention is to provide a molding procedure for the production of artificial teeth which lends itself to the use of any suitable moldable compositions, such as porcelain and the more recently developed synthetic plastics, of which latter the methyl methacrylate resin may be cited as an example, and which plastics may be either the thermosetting, heat polymerizable or thermoplastic type.

More specifically, it is an object of the present invention to provide a multiple step molding procedure for the production of artificial teeth which primarily involves the preliminary molding of an inner core part for the tooth and the inclusion of this molded inner core as an integral part of the completely molded tooth, the core being formed of a moldable composition which is preferably relatively opaque as distinguished from the relatively translucent or transparent composition which is molded about the core.

Still another and important object of the present invention is to provide a molding procedure by means of which the proper placement of the different moldable compositions within the mold is rendered practically automatic, to which end the preliminarily molded inner core part is employed as a part of the mold in which the complete tooth is finally molded to shape and size.

Other objects and advantages of the invention will appear more fully hereinafter, it being understood that the present invention generally consists in the construction and use of a mold, the several parts of which are relatively arranged and constructed as described in more or less detail in the following specification, as shown in the accompanying drawings, and as finally pointed out in the appended claim.

In the said accompanying drawings, which show a preferred construction of mold for use in practicing the present invention, Figure 1 is a perspective view of a tooth constructed in accordance with and embodying the principles of the present invention;

Figure 2 is a vertical sectional view of the tooth shown in Figure 1;

Figures 3, 4 and 5 are top plan, perspective and sectional views, respectively, of the preliminarily formed inner core part of the tooth;

Figure 6 is a sectional view of a pair of interfitted mold parts showing the preformed core part inserted in position within the mold cavity;

Figure 7 is a view similar to Figure 6, but showing the mold cavity filled with the composition of which the tooth tip and face portions are formed;

Figure 8 is a sectional view taken on the line 8—8 of Figure 7;

Figure 9 is a top plan view of one of the mold parts;

Figure 10 is a top plan view of the other complemental mold part;

Figure 11 is a sectional view showing a mold designed for the simultaneous molding of a plurality of teeth; and Figure 12 is a top plan view of one part of said plural-tooth mold showing the preformed inner core parts set in position within the mold cavities.

Referring now to the drawings, Figures 1 and 2 illustrate a form of artificial anterior tooth which is constructed in accordance with the procedure and method of the present invention, it being observed that such tooth includes an inner core part 10 about which is molded the outer body portions of the tooth, these latter including the labial face portion 11, the lingual face portion 12, and the incisal tip portion 13. As has been indicated, the tooth illustrated in Figures 1 and 2 is of the anterior type, as for example, an incisor, and it is to be understood that the principles of the present invention are applicable to all types of artificial teeth and particularly to all of the anterior teeth. The principal characteristic of the tooth as constructed in accordance with the method of the present invention, is that the core part 10 is prepared independently of the tooth as a whole in the shape of a preformed body of a suitable moldable composition, this preformed body being preferably relatively opaque as compared with the relatively translucent or transparent material of which the tooth facing and tip portions are formed, the compositions employed being of such character that when subjected to heat and pressure during the molding operation, they unite to provide in effect a one-piece, integral tooth structure. The shape of the inner core part 10 of the tooth may vary, depending upon the ultimate size and shape of the tooth to be formed, and it will be understood, therefore, that the present invention is in no sense limited to the particular form of the inner core part, such as is designated by the reference numeral 10 in the accompanying drawings.

It is also contemplated that various kinds of moldable compositions may be employed to form the inner core part 10 of the tooth and external parts 11, 12 and 13 thereof. For example, such parts of the tooth may be formed of porcelain, or they may be formed of any suitable plastic material having the ability to withstand the wear of biting and mastication, it being within the purview of the present invention to form the inner and outer parts of the tooth either entirely of porcelain or of a plastic material, or of a combination of the two, in which latter case the core part would be formed of one type of moldable material while the outer parts of the tooth would be formed of the other type of material. It is preferred, however, that the composition of the material forming the core part be rendered relatively opaque to simulate the dentine of the natural tooth, while that of the outer parts of the tooth are not only rendered relatively translucent or transparent, but may also be colored by the introduction of a suitable pigment to impart to the completed tooth any desired shading or coloring.

In constructing the tooth of the present invention, the core part 10, formed of any suitable moldable composition, such as porcelain, or any suitable plastic material, as for example, a methyl methacrylate type of resin, is preformed to shape by the use of any conventional molding procedure. The core part 10 as so preliminarily molded is suitably provided at its outer end with means for adequately and firmly supporting it in position within the mold cavity, as, for example, by an integrally formed wing element 14 which serves as a support for the core part during the subsequent operations of molding the complete tooth. This wing element 14 is transversely pierced to provide a hole 15 (see Figures 4 and 5) for the projection therethrough of a supporting pin 16 (see Figures 6 to 8), it being understood that when the complete tooth has been molded to final shape and size, the said wing element 14, as represented by the dotted lines in Figure 2, is removed, as by grinding the same away or by any other suitable operation. It will be understood, of course, that any other suitable means may be employed for removably securing the core part in position within one or the other of the mold sections.

As shown in Figures 6 to 10, inclusive, the method of the present invention involves the use of a pair of complementally shaped mold parts 17 and 18. These mold parts 17 and 18, which may be formed of any suitable material capable of withstanding the requisite temperatures and pressures suitable for molding the tooth to shape and size, are respectively provided with suitably shaped recesses 19 and 20 which conjointly constitute the tooth molding cavity 21. The die sections 17 and 18 are further provided with mating surfaces which surround the tooth molding cavity 21 and which coact, in the manner well known in the molding art, to seal the contacting marginal edges of the cavity 21 and at the same time limit the pressure of these contacting edges against one another to prevent injury thereto. In addition, the die sections 17 and 18 are respectively provided with coacting stud-and-socket elements 22—22 and 23—23 to insure that the said sections are properly interfitted together.

The recess 19 formed in the die section 17 is contoured to the shape of the labial face of the tooth, while the recess 20 in the section 18 is contoured to the shape of the lingual face. In addition, the recesses 19 and 20 are complementally contoured, as at 24 and 25, to the contour of the cervical flange or collar 26 of the tooth, this being the portion which is adapted to be embedded in the base material of the denture plate approximately to the depth of the cervical line 27 of the tooth. This cervical line 27 is formed by the transversely arched ridge 28 formed in the recess 19 of the die section 17.

The lap face 29 of the tooth is formed in the mold or die part 18 by the surface 30 at the rear end of the recess 20, it being noted at this point that this surface 30 is centrally notched or slotted, as at 31, to receive the wing element 14 of the preformed core part 10 when the latter is positioned in the mold part 18, as shown in Figure 6. In order to effect a proper seating of the core part 10 within the mold section 18, the said core part is contoured in its lap face 29a (see Figures 2 and 3) complementally to the contour of the mold surface 30, in consequence of which the outer end of the core part fits flush against said surface. The core part 10 is secured firmly in this position by means of the pin 16 which extends transversely through the mold section 18 and through the aperture 15 in the wing element 14 of the core part, it being apparent that when the latter is so secured in position, it forms in effect a part of the mold section 18.

Where the tooth is to be formed in its entirety of porcelain, the preformed core part 10 will be preliminarily shaped and biscuited out of a porcelain which is preferably of relatively opaque composition, following which it is keyed in the mold section 18 by means of the pin 16. Thereafter, a relatively translucent or transparent composition of porcelain pigmented to provide the required degree of shading is introduced in plastic state into each of the mold recesses 19 and 20 in sufficient quantity to completely fill the tooth molding cavity 21, whereupon the mold parts 17 and 18 are placed together and then preliminarily subjected to heat and pressure to form a biscuited tooth of which the core part 10 forms the inner body part.

Upon withdrawal of the retaining pin 16, the biscuited tooth is then removed as a unitary structure from the mold parts 17 and 18, following which it is subjected to the final vitrifying operation, in the course of which the core part 10 is so interfused with the surrounding shell part as to become integral therewith.

Inasmuch as the inner core part 10, as positioned within the mold section 18 preliminarily to packing the mold with the surrounding shell-forming porcelain composition, is accurately preformed to a given shape for each size and shape of tooth to be produced, it will be apparent that the same quantity of porcelain composition will always be introduced into the mold cavity to form the external shell of the tooth. Also, so long as this porcelain composition for the external shell is of uniform consistency insofar as concerns its relative translucency or transparency and in its degree of shading, all of the teeth formed in a particular mold or duplicate mold set will be uniformly of the same shading or coloring because the relative thickness and disposition of the lighter and darker porcelain materials employed in forming the inner core and outer shell parts of the tooth will be always the same.

It will be understood that the die sections 17 and 18, as well as the die sections for molding the preformed inner core part 10, may be prepared in any suitable manner in accordance with conventional practice, and the production of these die parts forms no particular part of the present invention except as they may be modified to receive the core part 10 to constitute the latter a part of one or the other of the die sections in which the tooth is molded to final form. To facilitate quantity production of the teeth, a multiple-tooth mold set may be employed of the character illustrated in Figures 11 and 12 and which consists of a pair of complemental die sections 32 and 33 respectively provided with a plural number of recesses 34 and 35 corresponding to the recesses 19 and 20 of the single-tooth mold set shown in Figures 6 to 10. In all cases, the die sections of a given mold set are bolted together, as by the bolts 36, to hold the sections together under the desired pressure.

As has been previously stated, various plastic compositions other than porcelain may be employed to form teeth in accordance with and embodying the principles of the present invention. Examples of such other plastic compositions are the acrylic resins, such as are described in United States Letters Patent No. 2,120,006, of Daniel E. Strain, and as has been previously indicated, such plastics may be either of the thermosetting, heat polymerizable or thermoplastic type.

In general, the procedure which is followed when the synthetic resins or other such plastic materials are employed in lieu of porcelain is the same as that described hereinbefore, with the exception that in the use of these synthetic materials, there is no necessity for any final vitrifying operation, as in the case where the teeth are formed entirely of porcelain.

Where the plastic resins of the thermosetting or thermoplastic type are employed, such material, in solid or powdered form, is placed in each of the recesses 19 and 20 of the mold sections (see Figure 6) to completely fill the same, following which these mold sections are clamped together and subjected to sufficient heat and pressure to form the completed tooth with the inner core element 10 as an integral part thereof. If desired, resins of the heat polymerizable type may be employed, in which case it is injected as a liquid under suitable pressure into the tooth-forming cavity 21 formed within the interfitted mold parts 17 and 18 to completely surround and encase the preformed inner core element 10 which had previously been keyed in position within one or the other of the interfitted mold parts, the liquid resinous material so injected into the tooth-forming cavity 21 being then subjected to sufficient heat to cause it to set into final shape. In order to permit this injection of the heat polymerizable type of resin into the tooth-forming cavity 21, one or the other of the mold sections is suitably provided with a passage or passages 37 opening as at 38 into the lap face end of the tooth cavity.

As in the case of the tooth formed exclusively of porcelain, the acrylic resin and other such materials may be varied in composition to provide for any desired degree of opacity or relative translucency or transparency, while the shading thereof may also be varied as desired through the introduction of any suitable pigment. Preferably, the preformed inner core element 10 is composed of a composition which is relatively opaque, while the composition which is introduced into the tooth-forming cavity 21 in surrounding relation to the core part and to form the external shell portion of the tooth is of relatively translucent or transparent character and pigmented to provide for the desired degree of shading for the tooth.

As has been previously indicated, it is entirely possible and practicable to prepare the preformed core part of a vitrified porcelain composition and then encase it, in accordance with the method and procedure of the present invention, within a surrounding shell formed of an entirely different type of moldable composition, such as an acrylic resin of the type hereinbefore described.

By the use of the method of the present invention, which is characterized chiefly by the fact that a preformed inner core element is employed in the molding operation in such manner as to insure uniform disposition and thickness of the material which forms the outer shell portion of the tooth, uniform production of teeth of a given size and shape and external appearance is insured without necessitating the employment of highly skilled labor. Not only does this method insure the identity in appearance of all teeth which should be duplicates of each other, but it also provides for more efficient and more rapid production and manufacture of artificial teeth, eliminating as it does much of the hand operations involved in the production of artificial teeth in accordance with conventional practice.

It will be understood, of course, that the present invention is susceptible of various changes and modifications which may be made from time to time without departing from the real spirit or general principles thereof, and it is accordingly understood that it is intended to claim the present invention broadly, as well as specifically, as indicated by the scope of the appended claim.

What is claimed as new and useful is:

A method of producing artificial teeth, of a shading simulating that of natural teeth, which consists in initially molding in a mold cavity from a relatively opaque thermoplastic tooth forming composition a self-sustaining relatively opaque dentine-simulating element of a tooth smaller in all dimensions than the finished tooth, then removing said element from said cavity and removably positioning it in the cavity of a tooth-forming mold of larger size than said first-mentioned cavity with the surfaces of the element spaced from the lingual and labial surfaces of the mold cavity to provide a space therein completely surrounding all but the one face of said element, then filling said space in the mold cavity with a thermoplastic tooth-forming composition which is relatively translucent as compared to the material of which the dentine-simulating element is formed, and then applying heat and pressure to the mold to mold the last mentioned composition into final tooth form about said dentine-simulating element as the central part of the tooth, said element imparting to the final tooth a shading characteristic of that imparted by the dentine to natural teeth.

JOSEPH KOHN.
MICHAEL RUSSELL STEIN.

REFERENCES CITED

The following references are of record in the file of this patent:

UNITED STATES PATENTS

| Number | Name | Date |
|---|---|---|
| 1,282,210 | Fromm | Oct. 22, 1918 |
| 2,011,477 | Fischer | Aug. 13, 1935 |
| 2,314,957 | Thornton et al. | Mar. 30, 1943 |
| 1,511,458 | Gibson | Oct. 14, 1924 |

FOREIGN PATENTS

| Number | Country | Date |
|---|---|---|
| 445,569 | Great Britain | Apr. 14, 1936 |
| 381,847 | France | Nov. 22, 1907 |

OTHER REFERENCES

Dental Digest, by Wilson, vol. 46 (1940), pp. 340-343.